United States Patent [19]

Salter, Jr. et al.

[11] Patent Number: 4,975,696
[45] Date of Patent: Dec. 4, 1990

[54] REAL-TIME FLIGHT AND DESTINATION DISPLAY FOR AIRCRAFT PASSENGERS

[75] Inventors: Richard J. Salter, Jr., Irvine; George S. Long, III, Santa Ana, both of Calif.

[73] Assignee: Asinc, Inc., Tustin, Calif.

[21] Appl. No.: 28,902

[22] Filed: Mar. 23, 1987

[51] Int. Cl.⁵ ............................................. G01C 23/00
[52] U.S. Cl. .................................. 340/973; 340/990; 358/103; 364/460
[58] Field of Search ............... 340/945, 971, 973, 947, 340/988–990, 992, 994, 995; 358/103, 109; 364/439, 460, 443, 444, 424, 428; 73/178 R

[56] References Cited

U.S. PATENT DOCUMENTS

| | | |
|---|---|---|
| 2,391,469 | 12/1945 | Marshall et al. |
| 2,484,462 | 10/1949 | Preston et al. |
| 3,088,107 | 4/1963 | Martienssen et al. |
| 3,706,969 | 12/1972 | Paredes |
| 3,715,716 | 2/1973 | Stiegemeier ............ 340/995 |
| 3,855,571 | 12/1974 | Massa |
| 3,886,515 | 5/1975 | Cottin et al. |
| 3,944,998 | 3/1976 | Perkins ............ 340/947 |
| 3,988,735 | 10/1976 | Bennett et al. ............ 340/990 |
| 4,041,529 | 8/1977 | Masterfield ............ 358/109 |
| 4,086,632 | 4/1978 | Lions ............ 340/286 M |
| 4,138,726 | 2/1979 | Girault et al. ............ 340/995 |
| 4,163,387 | 8/1979 | Schroeder ............ 340/973 |
| 4,297,672 | 10/1981 | Fruchey et al. |
| 4,360,876 | 11/1982 | Girault et al. ............ 340/995 |
| 4,428,057 | 1/1984 | Setliff et al. ............ 364/444 |
| 4,489,389 | 12/1984 | Beckwith et al. ............ 340/988 |
| 4,528,552 | 7/1985 | Moriyama et al. |
| 4,584,603 | 4/1986 | Harrison ............ 358/254 |
| 4,598,292 | 7/1986 | Devino ............ 340/971 |
| 4,647,980 | 3/1987 | Steventon et al. ............ 358/254 |
| 4,674,051 | 6/1987 | Fischer ............ 364/443 |
| 4,740,838 | 4/1988 | Mase et al. ............ 358/103 |

OTHER PUBLICATIONS

Brochure entitled "Airshow 100-Passenger Information and Entertainment System".
Brochure entitled "Airshow Cabin Video Information System", 1986.

Primary Examiner—Joseph A. Orsino
Assistant Examiner—Brent A. Swarthout
Attorney, Agent, or Firm—Price, Gess & Ubell

[57] ABSTRACT

A flight-worthy electronics package that connects into the airborne electronics of a passenger aircraft and to that aircraft's passenger visual display system provides passengers with a variety of information real-time displays. Information that may be displayed, as desired, is flight information such as ground speed, outside air temperature or altitude. Other information that may be displayed is a map of the area that the aircraft is flying over at any particular moment. Perhaps most useful to the passengers is destination information. Besides being able to display a chart of the terminals with all its aircraft gates, and identifying the gate at which the aircraft will be arriving, connecting flight information listing flight numbers, times, gates and destination may be displayed in conjunction with the terminal chart. A flight-worthy electronics package causes these displays to appear automatically on a real-time basis as determined by the programming of the system.

7 Claims, 5 Drawing Sheets

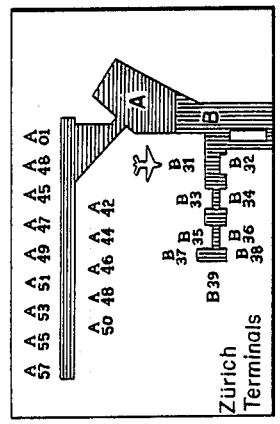
FIG. 7
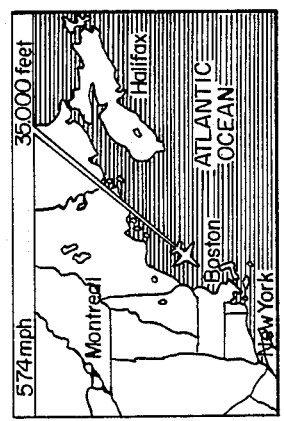
FIG. 5
FIG. 8
FIG. 6

4,975,696

REAL-TIME FLIGHT AND DESTINATION DISPLAY FOR AIRCRAFT PASSENGERS

BACKGROUND OF THE INVENTION

1. Field of the Invention

The present invention relates generally to improvements in aircraft passenger display systems and more particularly, pertains to new and improved video display systems in the passenger compartment of an aircraft wherein instructive and entertaining information is displayed to the passengers.

2. Description of the Prior Art

Display systems relating to aircraft abound in the prior art. Such systems are designed as free-standing, self-contained systems. These systems are utilized for a variety of purposes, such as tracking and analyzing information relating to air traffic control, displaying information on flights to provide for advanced planning and scheduling, and monitoring ground traffic at an airport. All of these systems are used solely for the administering of aircraft traffic. The passenger in the passenger compartment of the aircraft has been, until the present invention, pretty much ignored.

SUMMARY OF THE INVENTION

It is an object of this invention to provide a real-time flight information display system for aircraft passengers that provides useful information to the passengers en route to their destination.

A further object of the present invention is to provide a real-time flight information display system for aircraft passengers that connects into the aircraft's present passenger information display system.

Another object of the present invention is to provide a display system for aircraft passengers that displays a chart of the terminal at which the aircraft is to land with additional useful information such as the arrival gate, baggage claim area, and all the other gate locations in the terminal.

Yet another object of the present invention is to provide an aircraft passenger display system wherein said system displays connecting gate information such as departure gates, times of departure, destinations, and flight numbers, for example.

According to the present invention the foregoing and other objects are obtained as hereinafter set forth. The video display system of the aircraft is directed by the present invention to automatically display aircraft ground speed, outside temperature, and altitude, among other information of interest, as sensed by the aircraft's navigation and air data systems. The system of the present invention also stores a plurality of charts representing terminals at airports the aircraft may land at. These charts are displayed, as appropriate, over the aircraft's video display system upon the display system receiving information regarding flight number, destination airport and arrival gates, along with other information. The system also receives connecting gate information containing times of departure, departure gates, and destination for all outgoing flights, among other useful information, and displays this information on the aircraft's video system.

BRIEF DESCRIPTION OF THE DRAWINGS

Other objects and many of the attendant advantages of this invention will become apparent as the invention becomes better understood by reference to the following detailed description when considered in conjunction with the accompanying drawings in which like reference numerals designate like parts throughout the figures thereof and wherein:

FIG. 5 is a representation of a screen that may be displayed by the system of the present invention.

FIG. 6 is a representation of a screen containing information that is generated by the system and may be displayed.

FIG. 7 is a representation of a screen containing information that may be displayed by the present system.

FIG. 8 is a representation of a screen containing information that may be displayed by the present system.

DESCRIPTION OF THE PREFERRED EMBODIMENTS

Figure 1:
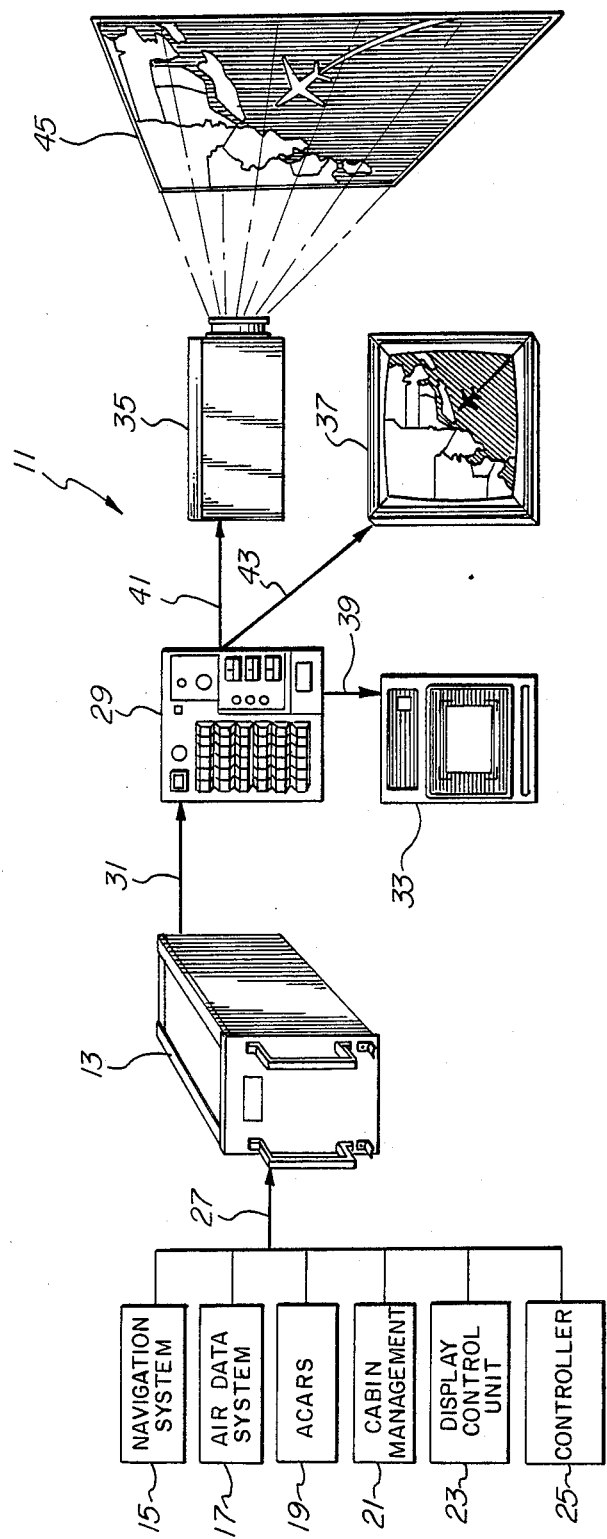
FIG. 1 is a block diagram somewhat in pictorial form of an aircraft video display system utilizing the present invention.

Referring first to FIG. 1, a is possible on-board system 11 for displaying information to the passengers in the aircraft passenger compartment is illustrated. The heart of the system, the data processor display generator 13, receives information over linking lines 27 from various systems of the aircraft. An example of such systems include the navigation system 15, aircraft air data system 17, the ACARS/AIRCOM/SITA communication network receiver 19, cabin management controller 21, display control unit 23 and a time-to-go controller 25. The data processor/display generator 13 may be hooked up to any one or a multiple of these input sources depending on the type of information desired to be displayed to the passengers of the aircraft.

After processing the information received, the data processor 13 transmits that information over link line 31 to a video selector unit 29 that may route the information to a plurality of video display systems. For example, the information may be submitted over link lines 39 to a preview monitor 33 or over link lines 43 to a video monitor 37, or over link lines 41 to a video projector 35 which projects the image received onto a video screen 45. It should be understood that this particular illustration of an aircraft video display system is only set forth as an example of one of many such systems that may be utilized and therefore should not be considered as limiting the present invention.

Figure 2:
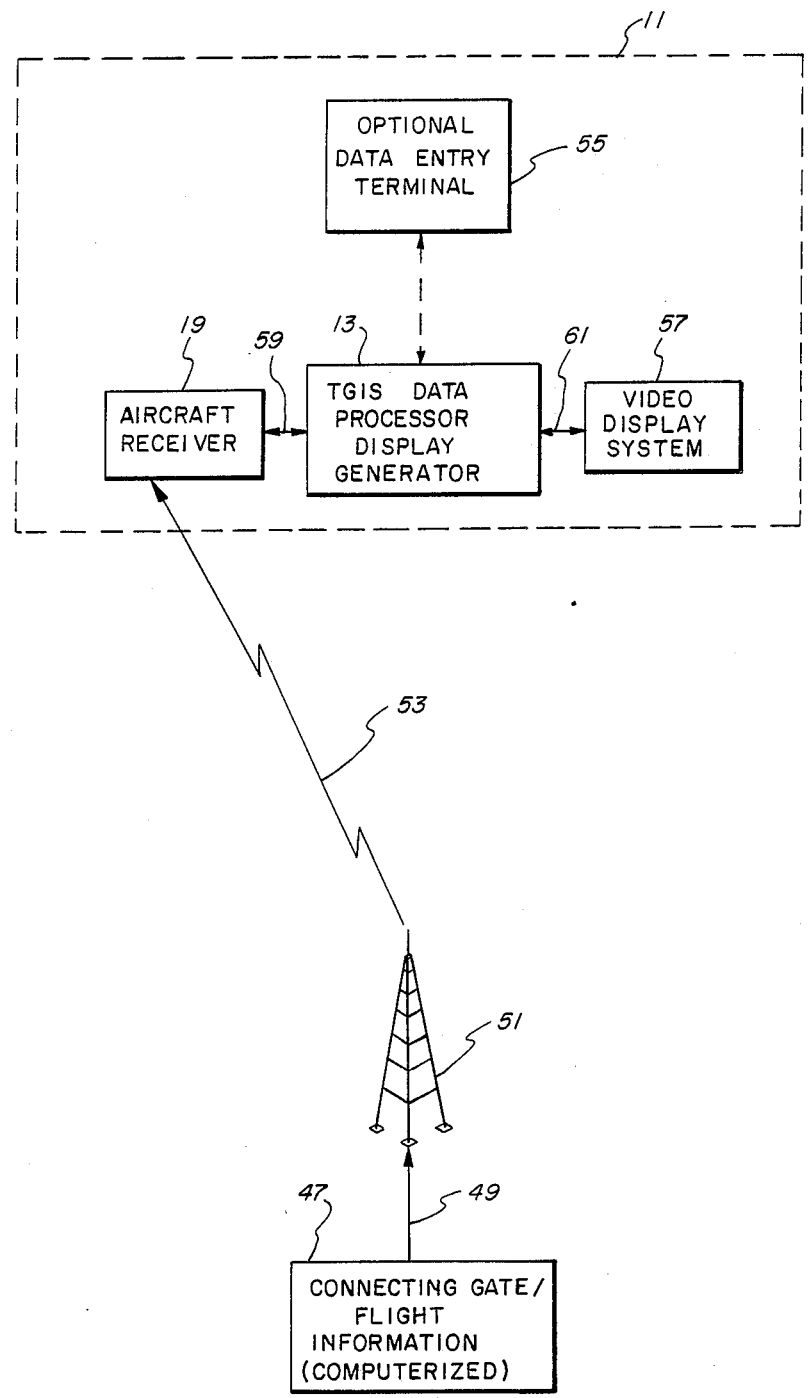
FIG. 2 is a block diagram of the display system according to the present invention including a ground to air communication link.

FIG. 2 illustrates the aircraft video display system 11 placed within the context of an airborne communication link between the aircraft and ground. The transmitting antenna 51 receives its information over an input line 49 from the airline's computer 47 which maintains, for example, connecting gate and flight information, as well as other information that the airline's ground station wishes to transmit to its aircraft. The information is transmitted on carrier waves 53 to the aircraft receiver 19 where it is demodulated and supplied to the data processor/display generator 13. The radio link from the ground station 47 to the aircraft carrier system 11 may be part of the ACARS/AIRCOM/SITA communication network. If it is, aircraft receiver 19 may transmit their demodulated data directly into the data processor display generator 13. If the communication link between ground and aircraft is not an ACARS/AIR-COM/SITA link, the information received by aircraft receiver 19 relating to the display of information to the passengers of the aircraft may be input to the optional data entry terminal 55 which is directly connected to the data processor display/generator 13.

The data processor/display generator receives the terminal gate information, processes it and generates the proper displays for presenting the information to the passenger audience of the aircraft. The modulated video signal is generated by the data processor/display generator 13 and transmitted over cable 61 to the video display system 57 of the aircraft.

Figure 3:
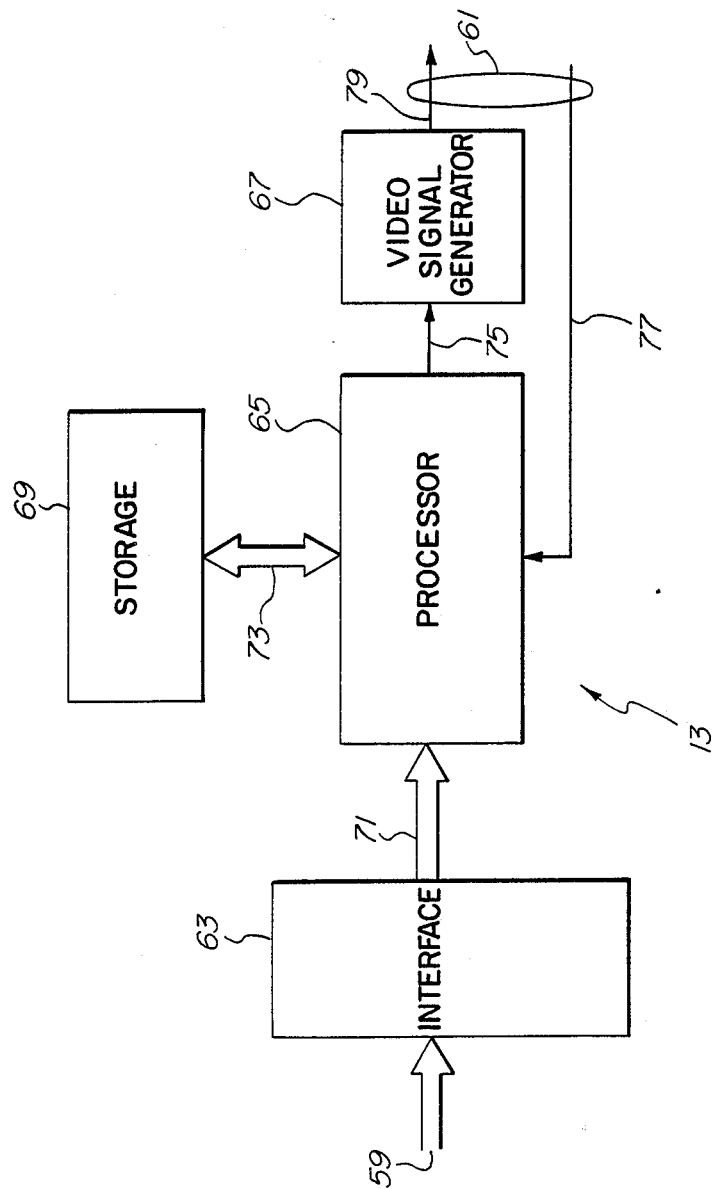
FIG. 3 is a block diagram of the data processor display generator of the present invention.

Referring to FIG. 3, a more detailed illustration of the data processor/display generator 13, according to the present invention is illustrated. The data processor essentially comprises interface circuitry 63 which receives terminal gate data from the input device, either by the automatic ACARS/AIRCOM/SITA link or manual input terminal, over cable 59, and provides that information to processor 65 over cable 71. The processor 65 manipulates the received data and transmits the data to the video signal generator 67. In response to the received information, processor 65 communicates with a storage unit 69 over link 73. The storage unit contains graphics for all the airport terminals that the particular aircraft will be flying in and out of. Processor 65 processes the received data to generate the video displays according to software resident in the computer in a manner as will be hereinafter described.

The data to be displayed is submitted by processor 65 to video signal generator 67 over line 75. The video signal generator modulates the output data onto a video signal to drive the displays (not shown). The processor also accepts control signals on line 77 from the video display system 57 for selecting these displays.

Assuming that the ground base station and the aircraft are communicating over an ACARS/AIRCOM/SITA communication system, the information being transmitted from the ground base computer is received by the ACARS/AIRCOM/SITA receiver and specifically the ACARS/AIRCOM/SITA management unit (all part of receiver 19). The data of interest to the display system of the present invention is output from the ACARS/AIRCOM/SITA management unit to the data processor/display generator 13 by way of the optional auxillary terminal port or cabin terminal port on the ACARS/AIRCOM/SITA management unit as described in ARINC characteristic 597, 724, or 724B.

In order for the data processor/display generator 13 of the present invention to promptly process and display the information received, the data is assumed to be in a specific fixed format when it is received from the management unit optional auxillary terminal port. The format illustrated below is an example of a desired format for up-linked data:

| | | | |
|---|---|---|---|
| 1. | .TULDDAA 241705 EB1B0A | | |
| 2. | OAT | | |
| 3. | AN N001AA/GL SNA | | |
| 4. | - FLT 0478 ARRIVING DFW | | |
| 5. | ARRIVAL GATE 37B BAG CLAIM AREA B4 | | |
| 6. | CONNECTING GATE INFORMATION | | |
| 7. | DESTINATION | DESTINATION | GATE |
| 8. | LOS ANGELES | | 23 |
| 9. | NEW YORK-LGA | | 27 |
| 10. | OMAHA | /DESMOINES | 25 |
| 11. | ORLANDO | | 37 |
| 12. | BALTIMORE | /WASHINGTON NATIO | 33E AE |
| 13. | END | | |

The data processor display generator of the present invention treats the up-linked data as two functionally separate sub-blocks, the header and the free-text. The header is defined by all the characters in the first five lines. The header format is fixed. The free-text is defined as all characters below the first five lines, that is lines 6 through 12 as illustrated above. The data processor display generator does not reformat the free text, rather it simply displays the text on a 24-line page exactly as it is received. In addition to the fixed data and free-text sub-blocks, the "END" string at the end of the block (line 13) is necessary to indicate that the complete block has been received by the data processor display generator. The end string is always the first three characters on the last line of the up-linked data block.

The five-line fixed header contains four strings of characters which are utilized by the data processor to generate its video displays. The four strings are the flight number string, the destination airport string, the arrival gate string and the baggage claim area string.

The flight number string is a ten-character string which is located at the first ten character positions in the fourth line. The first six characters of this string are fixed as "-FLT." The next four characters are variable with flight number. This string is detected and used by the processor for displaying the connecting gate information display page. Although the flight number is always four digits, the processor will perform leading zero blanking prior to its display.

The destination airport string is a 15-character string located immediately after the flight number string (i.e., the 11th through 25th characters in the fourth line). The first twelve characters of this string are fixed as "AR-RIVING." The next three characters are variable with a three-letter identifier of the destination airport. The processor uses this string to select the correct terminal chart for display.

The arrival gate string is a 17-character string located at the first 17 character positions in the fifth line. The first thirteen characters are fixed as "ARRIVAL GATE." The next four characters are variable with the arrival gate. The last four characters are always left justified in the four character sub-field, i.e., if a gate number is less than four characters, a field is filled with ASCII spaces on the right. The processor detects this string and displays the arrival gate on top of the connecting gate information display. It also uses the gate number to properly position an aircraft symbol at the arrival gate on the terminal chart.

The baggage claim area string is a 21-character string immediately following the arrival gate in the fifth line. The first 17 characters are fixed as "BAG CLAIM AREA." The last four characters are alphanumerics which vary with the baggage claim area. The last four characters are left justified in the four-character field with the right most positions being filled with ASCII spaces.

Figure 4:
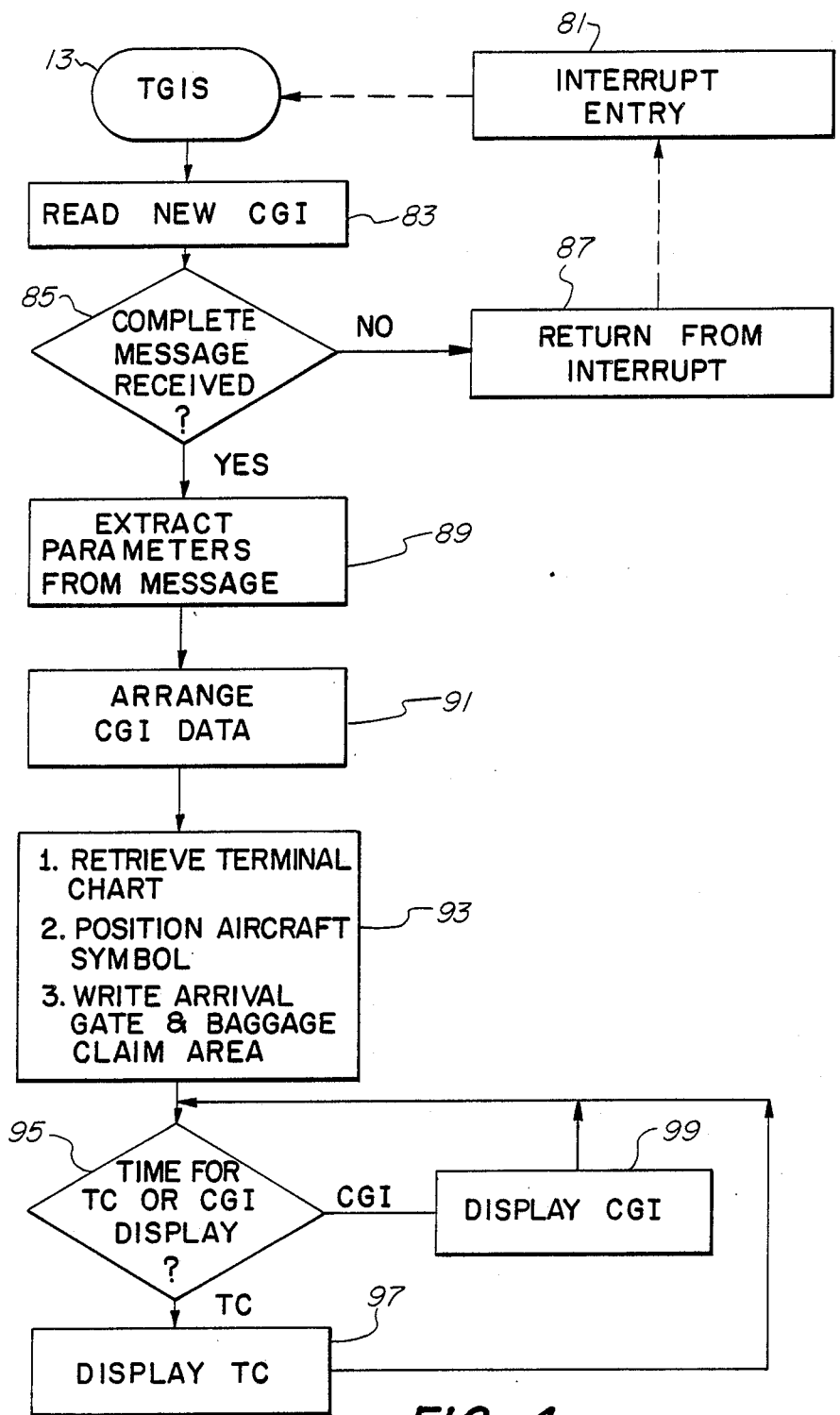
FIG. 4 is a flow chart of the process by which the data processor of the present invention functions to accomplish the ends of the invention.

The data processor display generator 13 operates on the information it receives in a manner illustrated by the flowchart of FIG. 4. The input to TGIS 13 (Terminal and Gate Information System) is from a digital data bus input port on an interrupt basis 81. Whenever there is information to be received, the data processor interrupts whatever it is doing to read the new data. The message will consist of a header containing specific parameters used to generate the display and free-text to be displayed. The processor will therefore read this connecting gate data 83 from the bus until a completed message 85 is received. The processor keeps returning to the interrupt 87 until an end of message is received.

After receiving an end of message, specific information, such as destination airport, arrival gate and baggage claim area, are extracted 89 from the header. The extracted connecting gate information is arranged into its predetermined page format 91 for display. The correct terminal chart signifying the destination airport at which the aircraft is to land is retrieved 93 from mass memory storage. The aircraft symbol is positioned at the arrival gate 93 on the terminal chart and the arrival gate and baggage claim area information is written on the terminal chart 93 for display. The terminal chart, along with its information, is modulated onto the video signal for output to the video display according to a specified sequence 95. The terminal chart is displayed 97 for a period of typically 10 to 60 seconds. Upon that display time being over, the free-text typically containing the connecting gate information is displayed 99 for the specified period of time.

If multiple pages of terminal charts or connecting gate information is to be displayed, the pages are cycled onto the display. The entire process is continually repeated.

Referring to FIG. 5, a display generated by the system of the present invention is shown which provides in-flight information to the passengers. The ground speed, outside air temperature, time to destination and altitude information, for example, can be obtained from the aircraft's navigation system 15 and air data system 17 (FIG. 1).

In addition to this information, the passengers may be shown maps of the areas over which the aircraft is presently traveling as illustrated in FIG. 6. The ground speed and altitude information may be displayed across the top portion of the map as shown in FIG. 6.

Upon the aircraft coming closer to its destination, the display illustrated in FIG. 7 may be presented to the passengers. This display sets forth all connecting flights, their destination, flight number, time and gate, as well as the arriving gate and baggage claim area for the aircraft.

In order to familiarize the passengers with the layout of the terminal and all the gates of the terminal, as well as the baggage claim areas, a display shown in FIG. 8 may be provided to the passengers. As can be seen, the terminal chart of FIG. 8 illustrates all the gates and terminal buildings for a particular airport, along with baggage claim areas. In addition, the aircraft symbol is located next to the arrival gate.

What has been described is a real-time flight information display system for aircraft passengers that provides useful information to the passengers en route to their destination. The system connects into the aircraft's present passenger video display system.

It displays a chart of the terminal at which the aircraft is to land with additional useful information such as the arrival gate, baggage claim area, and all the other gate locations in the terminal. It also displays connecting gate information such as departure gates, times of departure, destinations, and flight numbers, for example.

Various modifications are contemplated and they obviously will be resorted to by those skilled in the art without departing from the spirit and scope of the invention as hereinafter defined by the appending claims, as only a preferred embodiment of the invention has been disclosed.

What is claimed is:

1. A terminal and gate information display system for aircraft passengers in an aircraft having a video display system and a receiver for receiving messages from ground-based transmitters, said display system comprising:
   memory means for storing the data for a plurality of airport charts representative of the airports at which the aircraft may land;
   said receiver receiving information regarding flight number and the airport at which the aircraft is to land from a ground-based transmitter;
   data processor means utilizing the received flight number and airport information to retrieve the chart data of the airport from said memory means and inputting the chart data to said video display system for display;
   said receiver also receiving information regarding departing flight numbers, departure times, departure gates and destinations;
   said processor means inputting the departure flight numbers the departure time, departure gate and destination information to said video display system for display.

2. The terminal and gate information display system of claim 1 wherein said data processor means receives its information automatically from said ground-to-air communication link.

3. The terminal and gate information display system of claim 1 further comprising a data entry terminal wherein said data processor means receives its information from said data entry terminal.

4. A terminal and gate information display system for aircraft passengers in an aircraft having a video display system and a receiver for receiving messages from ground-based transmitters, said display system comprising:
   memory means for storing the data for a plurality of airport charts representative of the airports at which the aircraft may land;
   said receiver receiving information regarding flight number and the airport at which the aircraft is to land from a ground-based transmitter;
   data processor means utilizing the received flight number and airport information to retrieve the chart data of the airport from said memory means and inputting the chart data to said video display system for display,
   said receiver further receiving baggage claim area information, and
   said processor means inputting the baggage claim area information to said video display system for display.

5. A terminal and gate information display system for aircraft passengers in an aircraft having a video display system and a receiver for receiving messages from ground-based transmitters, said display system comprising:
   memory means for storing the data for a plurality of airport charts representative of the airports at which the aircraft may land, which includes aircraft arrival and departure gates;

said receiver receiving information regarding flight numbers and the airport at which the aircraft is to land from a ground-based transmitter;

data processor means utilizing the received flight number and airport information to retrieve the chart data of the airport from said memory means and inputting the chart data to said video display system for display;

said data processor means generating data for an indicator and inputting the indicator data to said video display system; and said video display system displaying the airport chart and the indicator located at the aircraft arrival gate illustrated on the airport chart.

6. A terminal and gate information display system for aircraft passengers in an aircraft having a video display system and a receiver for receiving messages from ground-based transmitters, said display system comprising:

memory means for storing the data for a plurality of airport charts representative of the airports at which the aircraft may land;

said receiver receiving information regarding flight number and the airport at which the aircraft is to land from a ground-based transmitter;

data processor means utilizing the received flight number and destination airport information to retrieve the chart data of the airport from said memory means and inputting the chart data to said video display system for display;

said receiver also receiving information of baggage claims area for an arriving flight, and gate, flight number, and departing time for relevant departing flights, at the airport;

said data processor means combining the airport chart data retrieved from the memory means with the information received from said receiver to generate data for input to said video display system to display an image wherein the terminal and gate of the arriving flight, its baggage claim area, and relevant terminals and gates of departing flights are indicated with respect to the physical layout of the airport.

7. The terminal and gate information system of claim 6 wherein the information transmitted to the said receiver propagates via a carrier band and has a format comprising:

a header defined by all the characters in a first specified portion of transmitted information;

an end flag designating the end of an information transmission; and free text defined by all the characters between the header and the end flag. .

* * * * *